Patented Apr. 19, 1949

2,467,861

UNITED STATES PATENT OFFICE 2,467,861

SYNTHESIS OF HYDROCARBONS

Walter G. Scharmann, Westfield, N. J., assignor to Standard Oil Development Company, a corporation of Delaware No Drawing. Application April 15, 1947, Serial No. 741,694

17 Claims. (Cl. 260—449.6)

1

This invention relates to the catalytic conversion of carbon oxides with hydrogen to form valuable synthetic products. The invention is more particularly concerned with an improved method of preventing the deactivation and disintegration of finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high anti-knock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst. The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthe-

2 sizing activity and selectivity toward normally liquid products with a strong tendency to carbonize during the synthesis reaction, that is, to form fixed carbon or coke-like catalyst deposits which can not be efficiently removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration particularly in fluid operation. The reduction of the true density of the catalyst resulting from its high content of low-density carbon coupled with the rapid disintegration of the catalyst particles causes the fluidized catalyst bed to expand thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

The present invention overcomes the aforementioned difficulties and affords various additional advantages as will be fully understood from the more detailed description given below.

It is, therefore, the principal object of my invention to provide an improved process for the catalytic conversion of CO and $H_2$.

Another object of my invention is to provide means for improving the operation of the catalytic conversion of CO and $H_2$ employing the fluid solids technique.

A more specific object of my invention is to provide means for reducing or eliminating the carbonization and disintegration tendencies of certain highly reactive and selective synthesis catalysts used in the catalytic conversion of CO and $H_2$ employing the fluid solids technique.

Other and further objects and advantages will appear hereinafter.

It has been found that the various representatives of the group of catalysts having carbonization tendencies vary considerably in their performance in fluid operation. Considerable variations have been noted even among such of these catalysts as contain the same catalytically active metal component, particularly among various iron catalysts.

For example, iron catalysts obtained by roasting sulfidic iron ores such as pyrites when unpromoted or promoted with low-activity promoters such as sodium compounds, particularly sodium carbonate or halide, or low concentrations of similar potassium compounds exhibit usually the following characteristics:

(1) Relatively low selectivity to liquid products
(2) Production of lower boiling point liquid products
(3) Low activity requiring low throughput
(4) Low degree of catalyst carbonization and disintegration On the other hand, iron catalysts of the type used in the ammonia synthesis from $N_2$ and $H_2$, which consist of reduced and fused iron oxide-alumina-silica-potassia composites (for example, in parts by weights, 95.4 $Fe_2O_3$, 2.6 $Al_2O_3$, 1.4 $SiO_2$, 2.0 $K_2O$) or iron catalysts obtained from reduced pyrites ashes and promoted with high-activity catalyst promoters such as larger concentrations (about 1–3%) of potassium compounds, particularly carbonate and halides are usually characterized by the following properties:

(1) High selectivity to liquid products
(2) Production of higher boiling point liquid products
(3) High activity permitting highest throughputs
(4) High degree of carbonization and disintegration It will be observed from the above comparison that the catalysts exhibiting the most desirable characteristics of high activity and selectivity to liquid products also have the strongest tendency toward carbonization and disintegration. These findings have been sufficiently confirmed by numerous experiments with other synthesis catalysts to permit a generalization to the effect that the higher the activity and liquid product selectivity of a synthesis catalyst the greater its carbonization and disintegration tendency in fluid operation.

It has also been found that carbonization and resulting disintegration of highly active and selective synthesis catalysts may be appreciably depressed and even completely prevented by applying the catalysts in the form of solids-in-gas suspensions of a sufficiently low catalyst concentration to prevent excessive heat releases over relatively limited areas. However, practical operation in this manner encounters serious difficulties resulting from the unfavorable heat transfer and unstable bed characteristics of the highly diluted catalyst suspensions required for this purpose.

In accordance with the present invention turbulent fluidized beds of conventional high density are used which comprises a minor proportion of high-activity, high-selectivity, strongly carbonizing catalyst particles and a major proportion of low-activity, low-selectivity low-carbonizing catalyst particles, of fluidizable size. In this manner high-activity, high-selectivity strongly carbonizing synthesis catalysts may be employed in fluid operation at catalyst concentrations below the limit of beginning carbonization but in the form of dense fluidized beds affording ideal heat transfer characteristics and bed stability. More than one kind of catalysts of either type mentioned may be incorporated in the mixture whereby the various other catalyst characteristics may be modified in many ways if desired.

When operating in this manner at suitable conditions of temperature, pressure and throughput, liquid product yields may be obtained which are far in excess of those obtainable with the low-activity, low-selectivity constituents alone, and which may usually closely approach the liquid product yields of the pure high-activity, high-selectivity strongly carbonizing constituents. Simultaneously, carbon formation may be negligible or disappear completely.

Catalyst mixtures in accordance with the present invention are preferably so composed that at a total catalyst concentration of the fluidized bed of about 50–150 lbs. per cu. ft. the concentration of the high-activity, high-selectivity strongly carbonizing component amounts to about 5–30 lbs. per cu. ft. It will be understood, of course, that the different component particles making up this catalyst mixture should have substantially the same gas buoyancy in order to assure uniform distribution of the different components throughout the fluidized bed.

Mixtures of this type may be preformed in the desired proportions outside the reaction zone and supplied in the mixed state to the reacting gases. However, I may also supply the individual components of the catalyst mixture separately to the reaction zone and thus control the rate of conversion and/or carbonization by varying the proportions of the individual catalyst components in the fluidized bed.

My preferred catalyst mixture comprises about 75–95 parts by weight of reduced iron pyrites ashes or sintered synthetic iron oxide promoted with about 0.3–1% of sodium carbonate and having an average particle size of about 125 microns as the low-activity, low-selectivity low-carbonizing component and about 5–25 parts by weight of ammonia synthesis catalyst having approximately the above identified composition and particle size, as the high-activity, high-selectivity strongly carbonizing component. Examples for other suitable combinations are reduced iron pyrites ashes without promoter or with other low-activity promoters, or reduced sintered iron oxides promoted with conventional promoters such as potassium compounds as the low-carbonizing component and ammonia synthesis catalyst or pyrites ashes promoted with patassium carbonate or fluoride as the strongly-carbonizing component. It may be advisable to sinter or slightly fuse the high activity component of the catalyst mixture, after the promoter has been added, in order to prevent promoter loss or migration to the low activity component.

The reaction conditions suitable for carrying out my process fall within conventional ranges of fluid hydrocarbon synthesis operation. Optimum conditions depend on the composition of the specific catalyst mixture used. Quite generally, good results are obtained when fresh synthesis gas with or without the addition of recycle gas is passed upwardly through a fluidized mixture of catalyst particles having a particle size falling between about 50 and 400 mesh, at a superficial gas velocity of about 0.1–3 ft. per second to establish a bed density of about 50–150 lbs. per cu. ft. and a gas throughput of about 5–25 cu. ft. of fresh $CO+H_2$ in the approximate ratio of 0.5–1:1, per lb. of mixed catalyst per hour. Temperatures of about 550°–850° F. and pressures of about 150–1000 lbs. per sq. in. are suitable for most catalyst mixtures involved, particularly for iron-base catalyst mixtures.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. In the process of producing valuable synthetic products by contacting carbon monoxide and hydrogen in synthesis proportions at synthesis conditions with a dense turbulent fluidized mass of finely divided synthesis catalyst, the improvement which comprises contacting said carbon monoxide and hydrogen with a fluidized catalyst mass which prior to said contacting comprises a major proportion of active iron-type synthesis catalyst particles which have a low carbonization tendency at the synthesis conditions and a minor proportion of active iron-type synthesis catalyst particles which have a strong carbonization tendency at the synthesis conditions said first and second mentioned particles having substantially the same gas buoyancy.

2. The process of claim 1 in which said first named catalyst particles have a low activity and a low selectivity to liquid products and said second named catalyst particles have a high activity and a high selectivity to liquid products.

3. The process of claim 1 in which the proportion of said first named particles is about 75–95 parts by weight and the proportion of said second named particles is about 5–25 parts by weight.

4. The process of claim 3 in which the total catalyst concentration of said mass is about 50–150 lbs. per cu. ft.

5. In the process of producing valuable synthetic products by contacting carbon monoxide and hydrogen in synthesis proportions at synthesis conditions with a dense turbulent fluidized mass of finely divided synthesis catalyst, the improvement which comprises contacting said carbon monoxide and hydrogen with a fluidized catalyst mass comprising a major proportion of active iron-base synthesis catalyst particles which have a relatively low activity, relatively low selectivity to liquid products and a low carbonization tendency and a minor proportion of active iron-base synthesis catalyst particles which have a relatively high activity, a relatively high selectivity to liquid products and a strong carbonization tendency at the synthesis conditions, said first and second mentioned particles having substantially the same gas buoyancy.

6. The process of claim 5 in which said first named particles comprise reduced iron pyrites ashes and said second named particles an iron base catalyst active in the synthesis of ammonia from $N_2$ and $H_2$.

7. The process of claim 5 in which the apparent density of said mass is about 50–150 lbs. per cu. ft. and the concentration of said second named particles in said bed is about 5–30 lbs. per cu. ft.

8. The process of claim 5 in which said second named particles comprise reduced iron pyrites ashes promoted with a potassium compound of high promoting activity.

9. The process of claim 5 in which said first named particles comprise reduced sintered iron oxide.

10. The process of claim 9 in which said second named particles comprise an iron base catalyst active in the synthesis of ammonia from $N_2$ and $H_2$.

11. The process of claim 9 in which said second named particles comprise reduced iron pyrites ashes promoted with a potassium compound of high promoting activity.

12. The process of claim 5 in which said second named particles are at least partially fused.

13. The process of claim 5 in which said first named particles comprise reduced iron pyrites ashes and said second named particles comprise reduced iron pyrites ashes strongly promoted with a potassium compound of high promoting activity.

14. The process of claim 5 in which said first named particles comprise reduced iron pyrites ashes.

15. The process of claim 5 in which the concentration of said second named particles in said mass is below the level at which substantial amounts of carbon are formed at the synthesis conditions.

16. The process of claim 15 in which said concentration corresponds to about 5–30 lbs. per cu. ft. of said mass.

17. The process of claim 5 in which the total catalyst concentration of said mass is about 50–150 lbs. per cu. ft.

WALTER G. SCHARMANN.

REFERENCES CITED

The following references are of record in the file of this patent:

UNITED STATES PATENTS

| Number | Name | Date |
|---|---|---|
| 1,741,306 | Jaeger | Dec. 31, 1929 |
| 1,942,530 | Bader et al. | Jan. 9, 1934 |
| 2,254,748 | Michael | Sept. 2, 1941 |
| 2,254,806 | Michael | Sept. 2, 1941 |
| 2,276,693 | Heath | Mar. 7, 1942 |
| 2,287,891 | Linckh | June 30, 1942 |
| 2,360,787 | Murphree | Oct. 17, 1944 |
| 2,393,240 | Dreyfus | Jan. 22, 1946 |
| 2,393,909 | Johnson | Jan. 29, 1946 |